United States Patent
Nishiyama et al.

(10) Patent No.: US 9,905,878 B2
(45) Date of Patent: Feb. 27, 2018

(54) FUEL CELL STACK AND FUEL CELL VEHICLE

(71) Applicant: HONDA MOTOR CO., LTD, Minato-ku, Tokyo (JP)

(72) Inventors: Tadashi Nishiyama, Wako (JP); Masaharu Suzuki, Wako (JP); Yusuke Nara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 166 days.

(21) Appl. No.: 14/843,198

(22) Filed: Sep. 2, 2015

(65) Prior Publication Data

US 2016/0064765 A1    Mar. 3, 2016

(30) Foreign Application Priority Data

Sep. 2, 2014 (JP) .................................. 2014-178236

(51) Int. Cl.
*B60L 11/18* (2006.01)
*H01M 8/2475* (2016.01)

(52) U.S. Cl.
CPC ....... *H01M 8/2475* (2013.01); *B60L 11/1883* (2013.01); *B60L 11/1898* (2013.01); *H01M 2250/20* (2013.01); *Y02T 90/32* (2013.01)

(58) Field of Classification Search
CPC ............ H01M 8/04014; H01M 8/2475; B60L 11/1892; B60L 11/1896; B60L 11/1898
See application file for complete search history.

(56) References Cited

U.S. PATENT DOCUMENTS

| 5,490,572 | A  | * | 2/1996 | Tajiri | ................. | B60H 1/00278 180/65.1 |
| 6,443,253 | B1 | * | 9/2002 | Whitehead | ............... | B60K 1/04 165/127 |
| 6,648,085 | B2 | * | 11/2003 | Nagura | .................... | B60K 1/00 180/65.1 |
| 6,782,914 | B2 | * | 8/2004 | Kami | ............... | B60K 15/03006 123/516 |
| 7,374,001 | B2 | * | 5/2008 | Uozumi | ................... | B60K 1/04 180/65.31 |
| 7,674,547 | B2 | * | 3/2010 | Yanagisawa | ...... | H01M 8/04156 429/424 |
| 7,770,679 | B2 | * | 8/2010 | Takaku | .................... | B60K 1/04 180/68.5 |

(Continued)

FOREIGN PATENT DOCUMENTS

| JP | 2000/225853 |   | 8/2000 |
| JP | 2000225853  | * | 8/2000 |

(Continued)

OTHER PUBLICATIONS

Japanese Office Action dated Dec. 20, 2016 corresponding to U.S. Appl. No. 14/843,198, filed Sep. 2, 2015.

*Primary Examiner* — Emma K Frick
(74) *Attorney, Agent, or Firm* — Amin, Turocy & Watson LLP (57) ABSTRACT

A fuel cell vehicle includes a fuel cell stack and a housing that has first and second end plates and four side plates connecting the sides of the first and second end plates. Projections provided on the first and second end plates have openings communicating with a space formed between an inner wall of the housing and a fuel cell laminate.

13 Claims, 6 Drawing Sheets

(56) References Cited

U.S. PATENT DOCUMENTS

| | | | |
|---|---|---|---|
| 8,820,451 B2 * | 9/2014 | Matsumoto | B60K 1/04 180/65.1 |
| 8,824,876 B2 * | 9/2014 | Ohtsuka | B60K 1/04 180/68.1 |
| 9,016,413 B2 * | 4/2015 | Ikeya | B60K 1/04 180/68.2 |
| 9,017,896 B2 * | 4/2015 | Matsumoto | B60L 11/1898 429/482 |
| 9,156,331 B2 * | 10/2015 | Murakami | B60K 11/06 |
| 9,312,549 B2 * | 4/2016 | Tachibana | B60K 11/06 |
| 9,539,897 B2 * | 1/2017 | Yoshinaga | B60L 11/1898 |
| 2005/0282058 A1 * | 12/2005 | Yanagisawa | H01M 8/04156 429/508 |
| 2013/0034795 A1 | 2/2013 | Matsumoto et al. | |
| 2013/0260275 A1 | 10/2013 | Ichihara et al. | |
| 2013/0316260 A1 | 11/2013 | Cherchi et al. | |
| 2014/0367182 A1 * | 12/2014 | Yoshinaga | B60L 11/1898 180/68.4 |
| 2015/0270562 A1 * | 9/2015 | Naito | H01M 8/04201 429/458 |
| 2017/0057339 A1 * | 3/2017 | Nakagawa | B60K 13/04 |

FOREIGN PATENT DOCUMENTS

| | | | |
|---|---|---|---|
| JP | 2004-040950 | | 2/2004 |
| JP | 2006-140007 | | 6/2006 |
| JP | 2007-213965 | | 8/2007 |
| JP | 2010-123492 | | 6/2010 |
| JP | 2010-126015 | | 6/2010 |
| JP | 2010126015 | * | 6/2010 |
| JP | 2010-170923 | | 8/2010 |
| JP | 2013-33676 | | 2/2013 |
| JP | 2014-071943 | | 4/2014 |
| WO | 2012086344 | | 6/2012 |
| WO | WO2013111669 | * | 8/2013 |

* cited by examiner

FUEL CELL STACK AND FUEL CELL VEHICLE

CROSS REFERENCES TO RELATED APPLICATIONS

The present application claims priority under 35 U.S.C. § 119 to Japanese Patent Application No. 2014-178236, filed Sep. 2, 2014, entitled "Fuel cell stack and fuel cell vehicle." The contents of this application are incorporated herein by reference in their entirety.

BACKGROUND

1. Field

The present disclosure relates to a fuel cell stack that has rectangular end plates disposed at ends, in a stacking direction, of a laminate including a plurality of fuel cells, and it relates to a fuel cell vehicle in which the fuel cell stack is installed.

2. Description of the Related Art

For example, a solid polymer fuel cell includes a membrane electrode assembly (MEA) that has an anode electrode provided one side and a cathode electrode provided on the other side of an electrolyte membrane, which is formed of a polymer ion exchange membrane. The MEA and separators disposed on both sides of the MEA form a power generating cell. The solid polymer fuel cell is typically formed of a predetermined number of power generating cells stacked on one another and is installed in a fuel cell vehicle so as to be used as a vehicle's fuel cell stack.

In fuel cell vehicles, hydrogen, which serves as a fuel gas, may leak into a space accommodating a fuel cell stack. Hence, a fuel cell car capable of efficiently discharging hydrogen leaking out of a fuel cell stack to the outside, as disclosed in Japanese Unexamined Patent Application Publication No. 2004-040950, has been proposed.

This fuel cell car has a closed space for accommodating the fuel cell in front of a vehicle cabin. Depending on the necessity, a first opening is provided in an upper part of the closed space, and a second opening is provided at a position where a negative pressure is produced during driving, so that hydrogen leaking out of the fuel cell system into the closed space can be discharged.

Hence, when the opening is provided in the upper part of the closed space, hydrogen leaking out of the fuel cell system into the closed space, particularly during parking, can be reliably discharged outside the vehicle. Furthermore, when the opening is provided at a position where a negative pressure is produced, hydrogen leaking out of the fuel cell system during driving can be discharged outside the closed space.

SUMMARY

The present application describes a fuel cell stack that can easily and reliably discharge fuel gas leaking into a housing with a simple structure and a fuel cell vehicle.

In the configuration disclosed in Japanese Unexamined Patent Application Publication No. 2004-040950, the opening is provided in the upper part of the closed space. Hence, when the vehicle is inclined in a front-rear direction or in a right-left direction, hydrogen may remain in the closed space. Thus, there is a problem that the leaked hydrogen cannot be reliably discharged outside the vehicle.

A fuel cell stack according to the present disclosure includes a plurality of fuel cells that are stacked on top of one another, forming a laminate, and generate power by an electrochemical reaction between fuel gas and oxidant gas. Rectangular end plates are provided at ends, in a stacking direction, of the laminate. The fuel cell stack includes a housing that has the pair of end plates and side plates connecting sides of the end plates. The end plates have openings at upper parts thereof in a direction of gravity, the openings communicating with a space formed between an inner wall of the housing and the laminate.

Moreover, in this fuel cell stack, it is desirable that the end plates have projections projecting to a side at the upper parts thereof in the direction of gravity, the projections having the openings.

Furthermore, a fuel cell vehicle according to the present disclosure includes a fuel cell stack installed in a front room. End plates have openings at upper parts thereof in the direction of gravity, the openings communicating with a space formed between an inner wall of the housing and a laminate. Exhaust pipes are connected to the openings. The exhaust pipes are connected to sides of a vehicle member constituting the front room to communicate between an inside space of the fuel cell stack and an outside of the fuel cell vehicle.

In the present disclosure, the end plates have the openings at the upper parts thereof in the direction of gravity, the openings communicating with the space formed between the inner wall of the housing and the laminate. Thus, the fuel gas rising in the housing is discharged to the outside of the fuel cell stack through the openings provided in the end plates.

Hence, the fuel gas does not undesirably stay in the housing, and the fuel gas leaking in the housing can be easily and reliably discharged to the outside of the fuel cell stack with a simple structure, regardless of an incline on which the fuel cell vehicle is situated.

DESCRIPTION OF THE PREFERRED EMBODIMENTS

Figure 1:
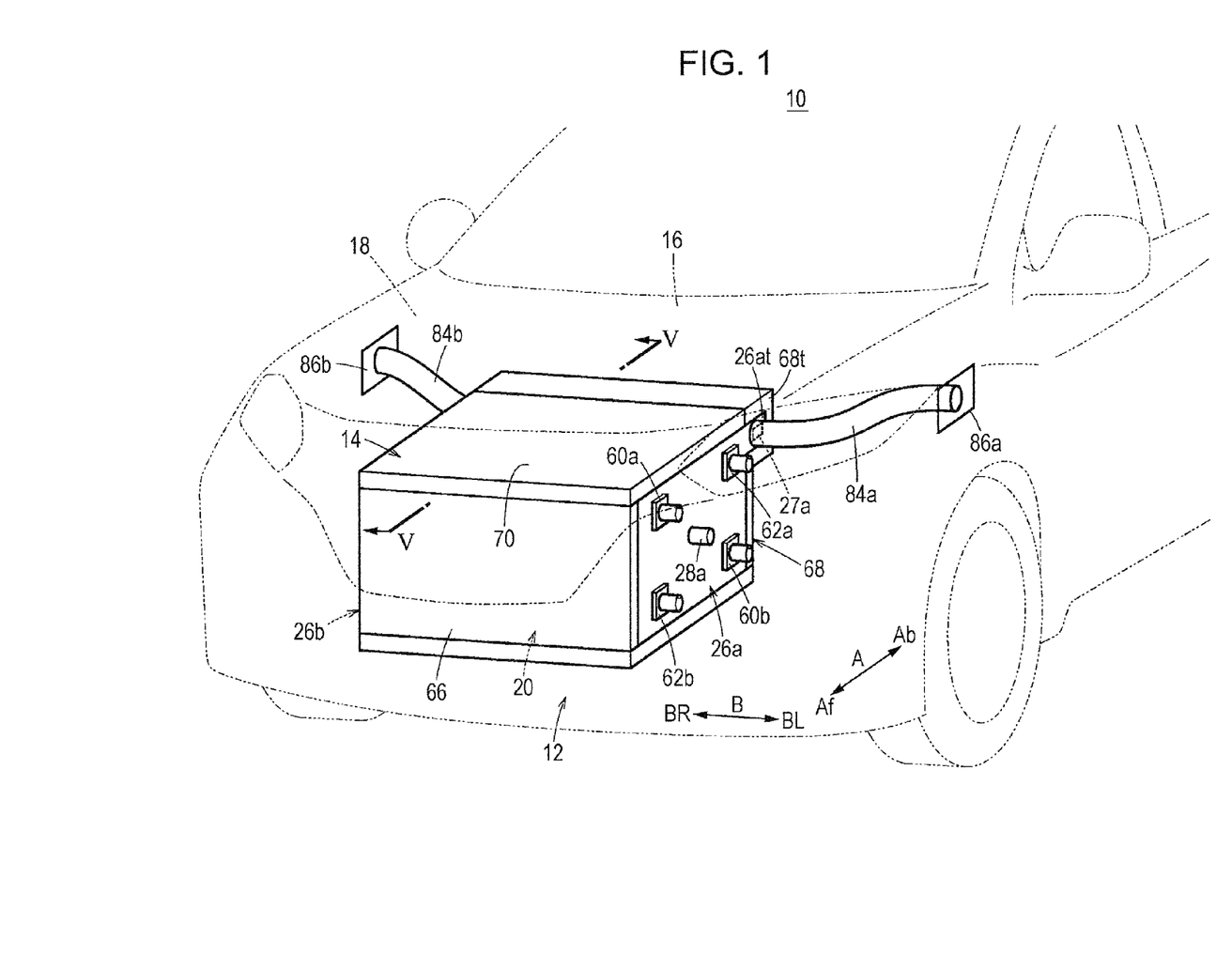
FIG. 1 is a schematic perspective view of a fuel cell vehicle according to an embodiment of the present disclosure.
Figure 2:
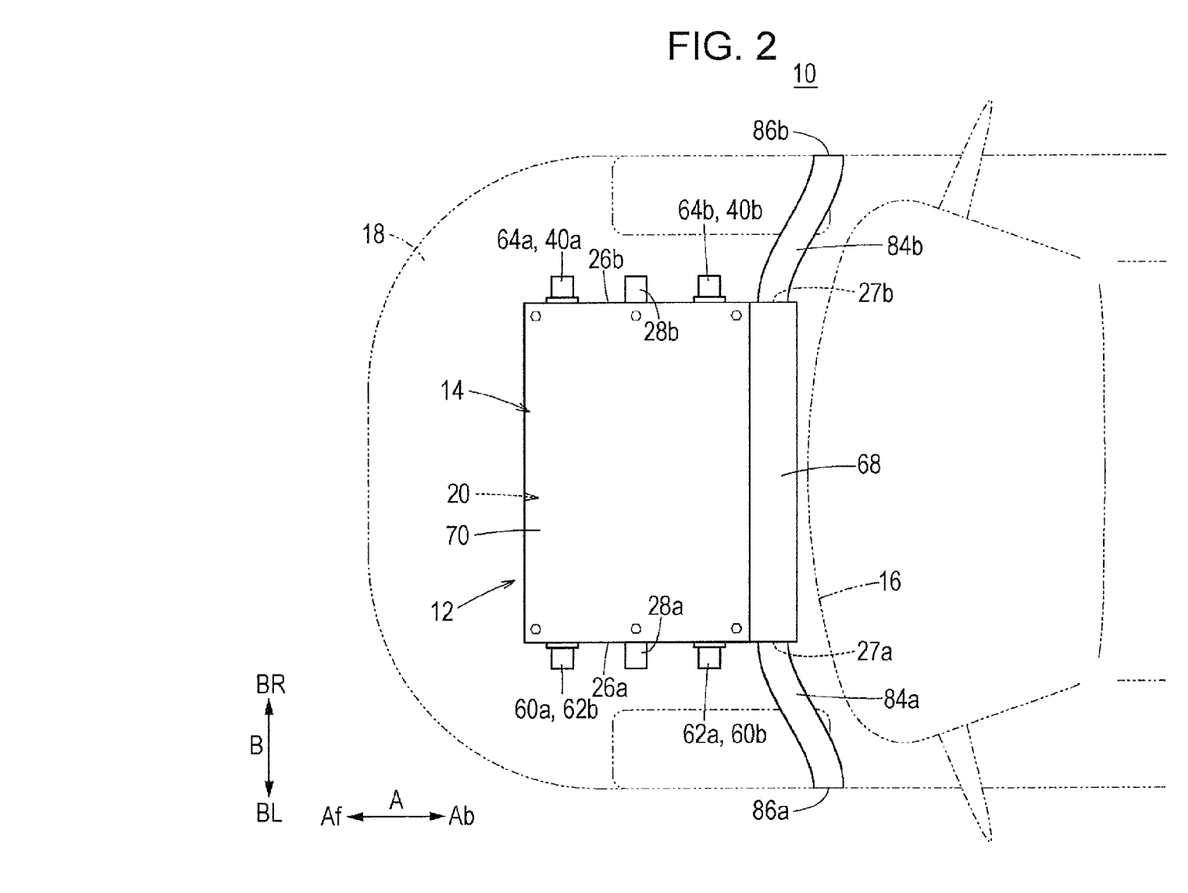
FIG. 2 is a schematic plan view of the fuel cell vehicle.

As shown in FIGS. 1 and 2, a fuel cell vehicle 10 according to an embodiment of the present disclosure is, for example, a fuel-cell electric vehicle. The fuel cell vehicle 10 has a housing 14 disposed in a front room (motor room) 18 formed in front of a dashboard 16. The housing 14 constitutes a fuel cell stack 12 according to the embodiment of the present disclosure, that is.

Figure 3:
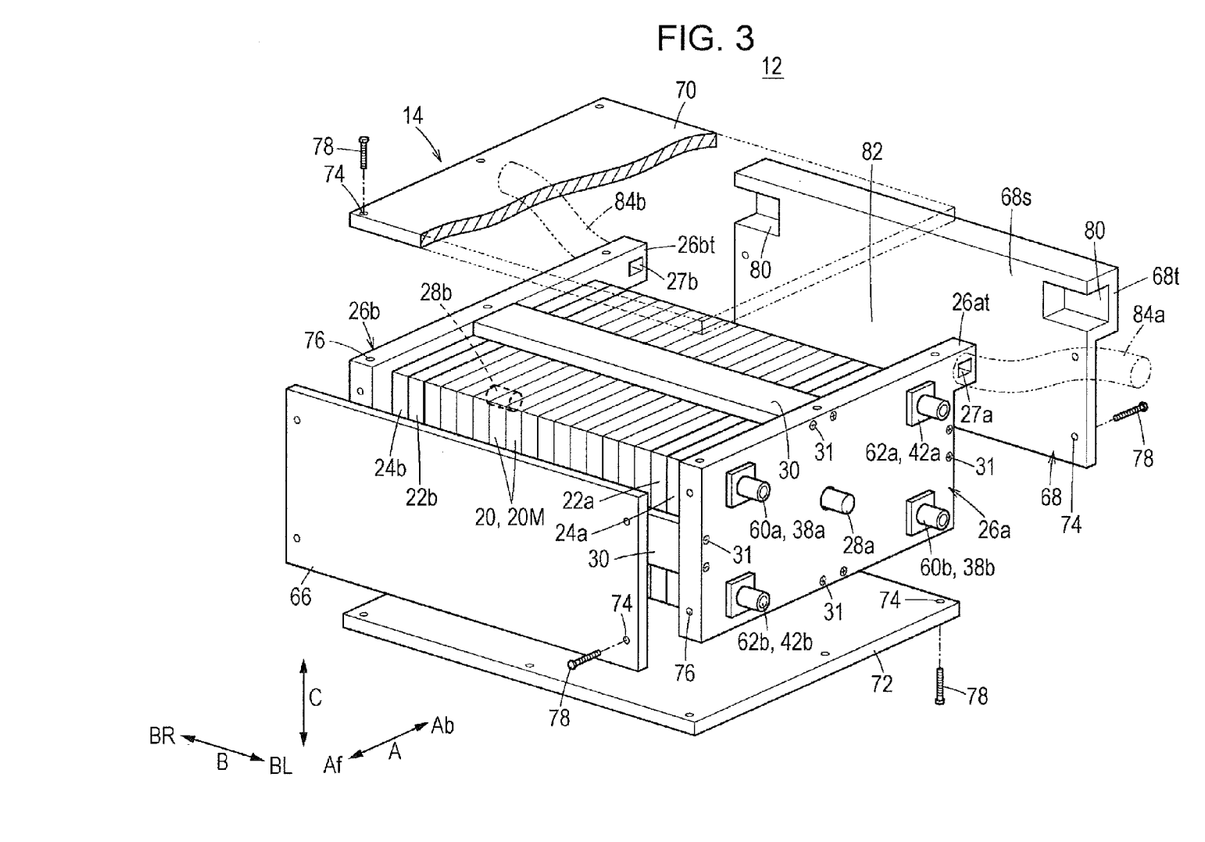
FIG. 3 is an exploded perspective view of a housing that constitutes a fuel cell stack according to the embodiment of the present disclosure.

As shown in FIG. 3, the fuel cell stack 12 includes a fuel cell laminate 20M that is formed of a plurality of fuel cells 20 stacked in a vehicle width direction (arrow B direction). The fuel cell laminate 20M includes a first terminal plate 22a, a first insulating plate 24a, and a first end plate 26a, which are arranged in this order from the inside to the outside, at an end in the stacking direction (the stacking direction in this embodiment is also indicated by the arrow in the B direction). The fuel cell laminate 20M includes a second terminal plate 22b, a second insulating plate 24b, and a second end plate 26b, which are arranged in this order from the inside to the outside, at the other end in the stacking direction. The first and second end plates 26a and 26b are located at the ends, in the vehicle width direction, of the fuel cell stack 12.

The first and second end plates 26a and 26b are larger than the fuel cells 20, the first insulating plate 24a, and the second insulating plate 24b. The first and second end plates 26a and 26b have projections 26at and 26bt, respectively, at upper corners, in the direction of gravity (arrow C direction), the projections 26at and 26bt projecting to a side (arrow A direction). The projections 26at and 26bt have openings 27a and 27b, respectively. The projections 26at and 26bt are desirably provided at the top, in the direction of gravity, of the first and second end plates 26a and 26b.

The first terminal plate 22a may be accommodated in a recess formed in the first insulating plate 24a, and the second terminal plate 22b may be accommodated in a recess formed in the second insulating plate 24b.

A first power output terminal 28a connected to the first terminal plate 22a extends to the outside of the housing from substantially the center (or a position displaced from the center) of the horizontally elongated first end plate 26a. A second power output terminal 28b connected to the second terminal plate 22b extends to the outside from substantially the center (or a position displaced from the center) of the horizontally elongated second end plate 26b.

Joint bars 30 having the same length are disposed between the corresponding sides of the first and second end plates 26a and 26b, the joint bars 30 being located substantially in the middle of the respective sides. Ends of the joint bars 30 are fixed by screws 31, thus applying a clamping load, in the stacking direction (arrow B direction), to the fuel cell laminate 20M.

Figure 4:
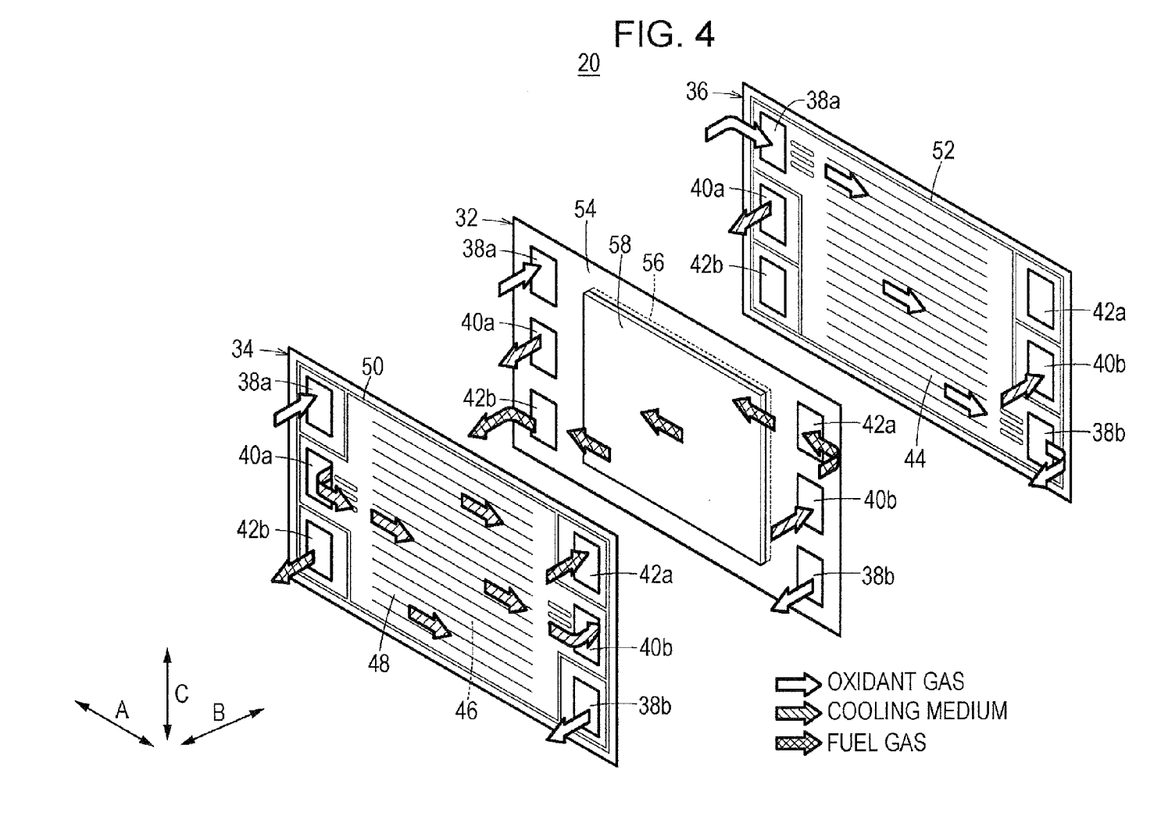
FIG. 4 is an exploded perspective view of the relevant part of a fuel cell that constitutes the fuel cell stack.

As shown in FIG. 4, each fuel cell 20 includes a first separator 34, a second separator 36, and an MEA 32 disposed therebetween. The first and second separators 34 and 36 are metal separators or carbon separators.

The fuel cells 20 have oxidant gas inlet manifolds 38a, cooling medium inlet manifolds 40a, and fuel gas outlet manifolds 42b, which are arranged in this order in the arrow C direction (vertical direction), at ends in the arrow A direction. These manifolds communicate with one another in the stacking direction (arrow B direction). An oxidant gas, e.g., an oxygen containing gas, is supplied through the oxidant gas inlet manifolds 38a. A cooling medium is supplied through the cooling medium inlet manifolds 40a. A fuel gas, e.g., a hydrogen containing gas, is discharged through the fuel gas outlet manifolds 42b.

The fuel cells 20 have fuel gas inlet manifolds 42a, cooling medium outlet manifolds 40b, and oxidant gas outlet manifolds 38b, which are arranged in this order in the arrow C direction, at the other ends in the arrow A direction. These manifolds communicate with one another in the arrow B direction. The fuel gas is supplied through the fuel gas inlet manifolds 42a, the cooling medium is discharged through the cooling medium outlet manifolds 40b, and the oxidant gas is discharged through the oxidant gas outlet manifolds 38b.

The second separator 36 has, in a surface facing the MEA 32, an oxidant gas flow path 44 communicating with the oxidant gas inlet manifold 38a and the oxidant gas outlet manifold 38b. The first separator 34 has, in a surface facing the MEA 32, a fuel gas flow path 46 communicating with the fuel gas inlet manifold 42a and the fuel gas outlet manifold 42b.

A cooling medium flow path 48 that communicates between the cooling medium inlet manifold 40a and the cooling medium outlet manifold 40b is provided between the first and second separators 34 and 36 that are adjacent to each other to form the fuel cell 20. The first and second separators 34 and 36 are integrally or individually provided with a first sealing member 50 and a second sealing member 52.

The first sealing member 50 and the second sealing member 52 are elastic sealing members, such as sealing members, cushioning members, and packing members, that are formed of, for example, EPDM (ethylene propylene diene monomer rubber), NBR (nitrile butadiene rubber), fluorocarbon rubber, silicone rubber, fluorosilicone rubber, butyl rubber, natural rubber, styrene rubber, chloroprene rubber, or acrylic rubber.

The MEA 32 includes, for example, a solid polymer electrolyte membrane 54 that is formed of a perfluorosulfonic acid membrane impregnated with water, a cathode electrode 56, and an anode electrode 58 that are disposed on both sides of the solid polymer electrolyte membrane 54. The cathode electrode 56 and the anode electrode 58 include a gas diffusion layer that is formed of a carbon paper or the like, and an electrode catalyst layer that is formed by uniformly applying porous carbon particles supporting a platinum alloy on the surfaces thereof to the surface of the gas diffusion layer. The electrode catalyst layer is formed on each side of the solid polymer electrolyte membrane 54.

As shown in FIG. 3, the first end plate 26a has, at first diagonal corners, an oxidant gas inlet manifold 60a communicating with the oxidant gas inlet manifold 38a and an oxidant gas outlet manifold 60b communicating with the oxidant gas outlet manifold 38b. The first end plate 26a has, at second diagonal corners, a fuel gas inlet manifold 62a communicating with the fuel gas inlet manifold 42a and a fuel gas outlet manifold 62b communicating with the fuel gas outlet manifold 42b. More desirably, the fuel gas inlet manifold 62a is provided at the corner having the projection 26at.

As shown in FIG. 2, the second end plate 26b is provided with a cooling medium inlet manifold 64a communicating with the cooling medium inlet manifold 40a and a cooling medium outlet manifold 64b communicating with the cooling medium outlet manifold 40b.

Figure 5:
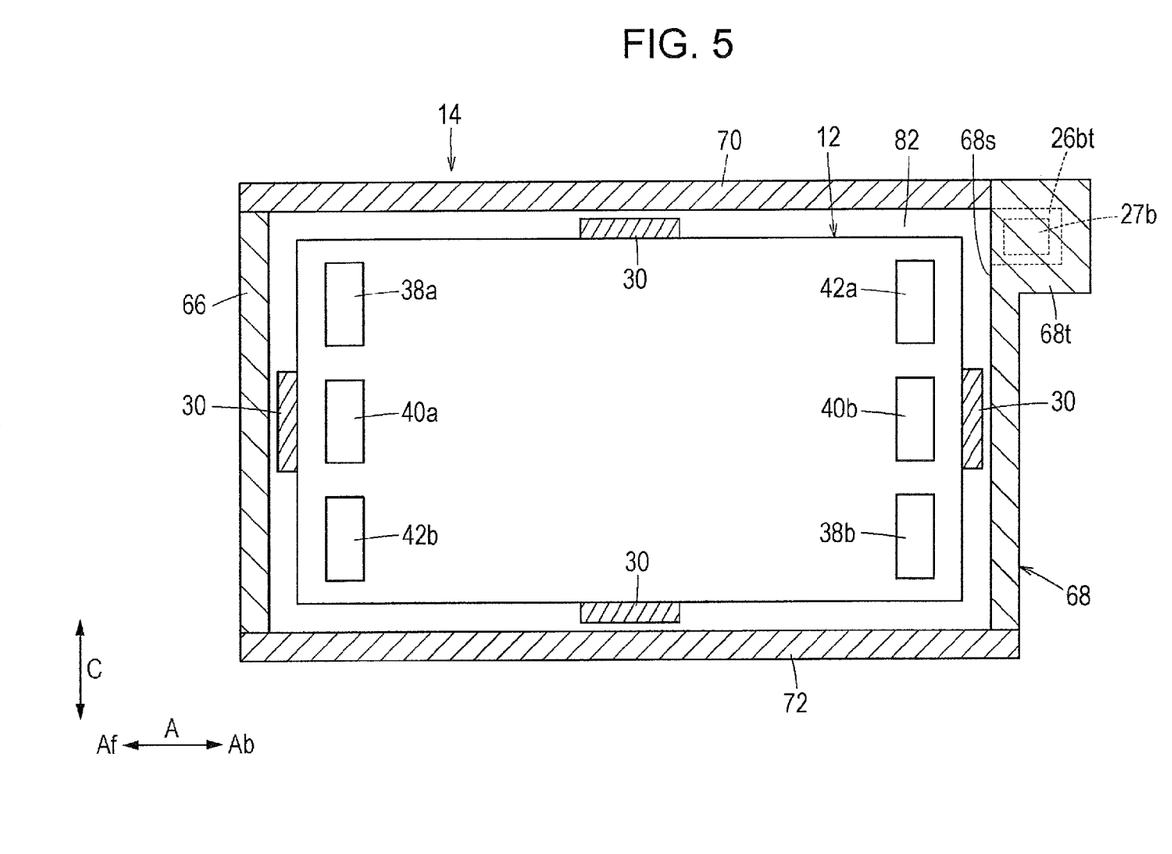
FIG. 5 is a sectional view of the fuel cell stack, taken along line V-V in FIG. 1.

As shown in FIG. 3, the fuel cell stack 12 is accommodated in the housing 14 having a rectangular shape in plan view. As shown in FIGS. 1, 3, and 5, the housing 14 includes a front side panel 66, a rear side panel 68, an upper panel 70, and a lower panel 72 that serve as side plates connecting the sides of the first and second end plates 26a and 26b. The side plates constituting the housing 14 are fixed to one another and to the first and second end plates 26a and 26b with screws 78 that mesh with screw holes 76 via holes 74.

The number of side plates is not limited to four, but may be two, for example. A combination of two side plates having an L-shaped section or a combination of one flat plate and one angular U-shaped plate is also possible, as long as a space for accommodating the fuel cell stack 12 is provided within the side plates.

Figure 6:
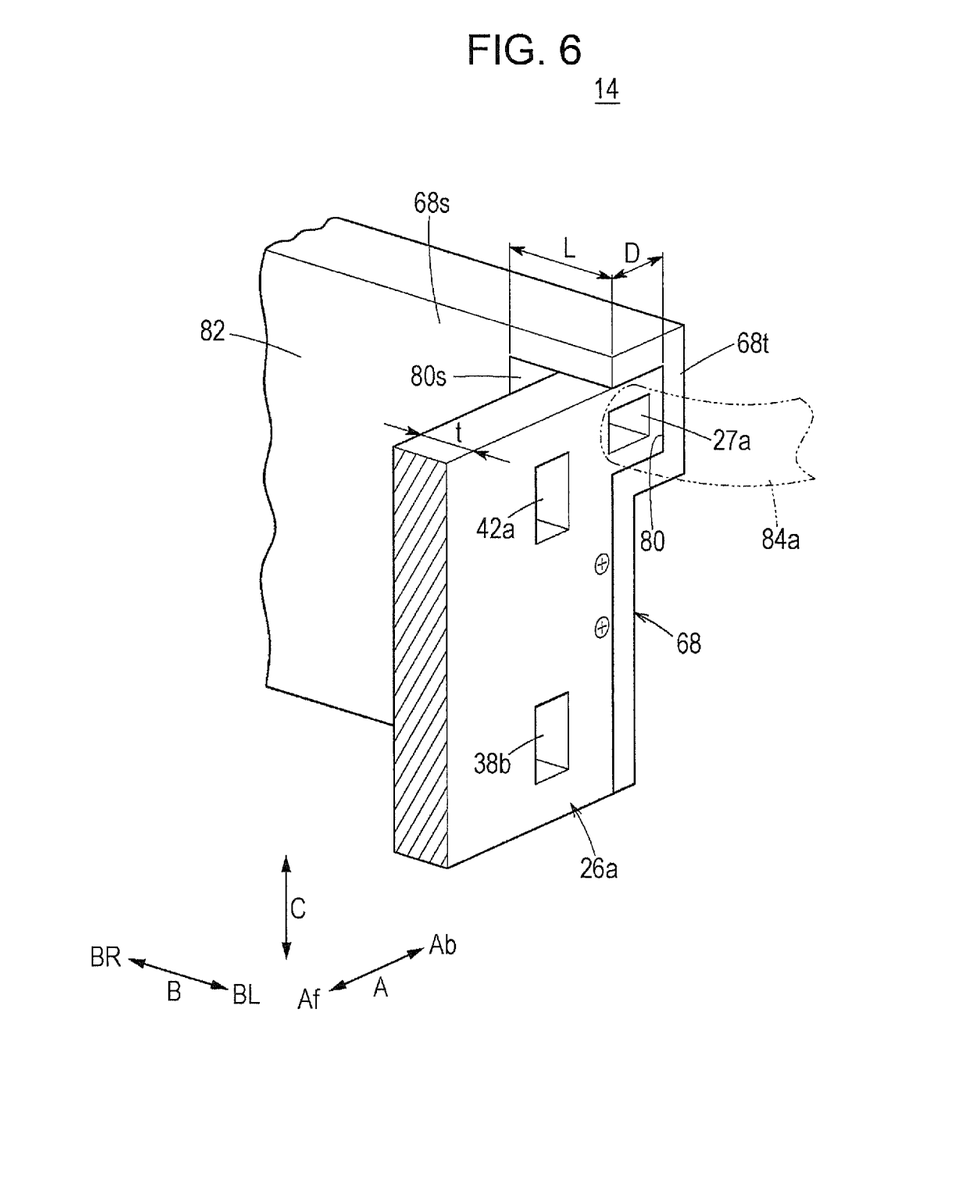
FIG. 6 is a perspective view of the relevant part of the housing.

The rear side panel 68 that constitutes the rear side surface of the housing 14 has a large-thickness portion 68t at the top in the direction of gravity, and the large-thickness portion 68t extends in the longitudinal direction (arrow B direction). As shown in FIGS. 3 and 6, the large-thickness portion 68t has, in a flat surface 68s (a surface adjacent to the fuel cell laminate 20M), recesses (concave portions) 80 that extend inward from the ends in the longitudinal direction, have a predetermined length L, and have a predetermined depth D.

One of the recesses 80 receives the projection 26at of the first end plate 26a, and the other of the recesses 80 receives the projection 26bt of the second end plate 26b. The thickness, t, of the first and second end plates 26a and 26b is smaller than the length, L, of the recesses 80. When the first and second end plates 26a and 26b are disposed in the recesses 80, the recesses 80 have gaps 80s (see FIG. 6).

The gaps 80s communicate with a space 82 (see FIG. 5) formed between the fuel cell laminate 20M and an inner wall of the housing 14. The space 82 communicates with the openings 27a and 27b in the projections 26at and 26bt. As shown in FIG. 6, the depth, D, of the recesses 80 is larger than the length by which the projections 26at and 26bt project. Note that the large-thickness portion 68t formed as a separate member may be joined to the rear side panel 68 with screws or by bonding.

As shown in FIG. 3, ends of exhaust ducts (exhaust pipes) 84a and 84b are connected to the openings 27a and 27b. As shown in FIGS. 1 and 2, the exhaust duct 84a projects from a side of the housing 14, extends upward in the vehicle width direction (arrow BL direction), and is connected to a vehicle exhaust outlet 86a (vehicle member). The vehicle exhaust outlet 86a communicates with the outside of the front room 18.

The exhaust duct 84b projects from another side of the housing 14 (as compared to exhaust duct 84a; that is, a different side than exhaust duct 84a), extends upward in the vehicle width direction (arrow BR direction), and is connected to a vehicle exhaust outlet 86b (vehicle member). The vehicle exhaust outlet 86b communicates with the outside of the front room 18. The fuel cell stack 12 is fixed to a vehicle frame via a mounting member (not shown) provided on the first and second end plates 26a and 26b.

The operation of the thus-configured fuel cell vehicle 10 will be described below.

When the fuel cell vehicle 10 is driving, as shown in FIG. 3, the fuel gas is supplied from the fuel gas inlet manifold 62a in the first end plate 26a to the fuel gas inlet manifold 42a. Meanwhile, oxidant gas is supplied from the oxidant gas inlet manifold 60a of the first end plate 26a to the oxidant gas inlet manifold 38a.

As shown in FIG. 4, the fuel gas is introduced into the fuel gas flow path 46 of the first separator 34 from the fuel gas inlet manifold 42a. For example, hydrogen gas is supplied along the anode electrode 58 constituting the MEA 32.

The oxidant gas is introduced from the oxidant gas inlet manifold 38a into the oxidant gas flow path 44 in the second separator 36. The oxidant gas is supplied along the cathode electrode 56 constituting the MEA 32. An example of oxidant gas includes air, which contains oxygen gas.

In the MEA 32, the hydrogen gas supplied to the anode electrode 58 and the air supplied to the cathode electrode 56 are consumed by the electrochemical reaction in the electrode catalyst layer, generating power.

As shown in FIG. 3, the fuel gas is discharged from the fuel gas outlet manifold 42b to the fuel gas outlet manifold 62b in the first end plate 26a. The oxidant gas is discharged from the oxidant gas outlet manifold 38b to the oxidant gas outlet manifold 60b in the first end plate 26a.

As shown in FIG. 2, the cooling medium is supplied from the cooling medium inlet manifold 64a in the second end plate 26b to the cooling medium inlet manifold 40a. As shown in FIG. 4, the cooling medium is introduced into the cooling medium flow path 48 between the first and second separators 34 and 36. The cooling medium cools the MEA 32, flows through the cooling medium outlet manifold 40b, and is discharged into the cooling medium outlet manifold 64b.

In this embodiment, as shown in FIG. 3, the openings 27a and 27b communicating with the space 82 formed between the inner wall of the housing 14 and the fuel cell laminate 20M are provided in the projection 26at of the first end plate 26a and the projection 26bt of the second end plate 26b. More specifically, the projections 26at and 26bt are disposed in the recesses 80 formed in the large-thickness portion 68t of the rear side panel 68, and the recesses 80 communicate with the space 82 via the gaps 80s (see FIG. 6).

Thus, the gas containing the fuel gas and rising in the housing 14 (hereinbelow also referred to as "exhaust gas") moves to the upper side of the space 82 and is introduced into the openings 27a and 27b through the gaps 80s. The exhaust gas is discharged to the outside of the fuel cell stack 12 through the exhaust ducts 84a and 84b communicating with the openings 27a and 27b. Hence, the fuel gas does not stay in the housing 14, and the fuel gas leaking into the housing 14 can be easily and reliably discharged to the outside with a simple structure.

At this time, the other ends of the exhaust ducts 84a and 84b are open to the outside via the vehicle exhaust outlets 86a and 86b. With this structure, the fuel gas leaking out of the fuel cell stack 12 is easily and reliably discharged to the outside of the fuel cell vehicle 10, and it is possible to prevent the fuel gas from staying in the front room 18 as much as possible.

Furthermore, the fuel cell stack 12 is provided with the exhaust ducts 84a and 84b at the ends in the stacking direction (arrow B direction). Hence, when the fuel cell vehicle 10 is inclined in the right-left direction such that the right side thereof is lower than the left side thereof, the leaked fuel gas is reliably discharged from the exhaust duct 84a and is not trapped within the housing. Similarly, when the fuel cell vehicle 10 is inclined in the right-left direction such that the left side thereof is lower than the right side thereof, the leaked fuel gas is reliably discharged from the exhaust duct 84b.

While the invention has been particularly shown and described with a reference to the described embodiments, it will be understood that variations and modifications can be effected thereto by those skilled in the art without departing from the scope of the invention as defined by the appended claims.

What is claimed is:

1. A fuel cell vehicle comprising a fuel cell stack installed in a front room, the fuel cell stack including: a plurality of fuel cells that are stacked next to one another in a first direction, forming a laminate, and generate power by an electrochemical reaction between fuel gas and oxidant gas; and a housing that includes rectangular end plates provided at ends, in a stacking direction, of the plurality of fuel cells and includes side plates connecting sides of the end plates, wherein the end plates have openings at upper parts thereof in a direction of gravity, the openings communicating with a space formed between an inner wall of the housing and the laminate, wherein the end plates have projections at the upper parts thereof in the direction of gravity, the projections projecting in a second direction orthogonal to the first direction, and the projections having the openings; and exhaust pipes connected to the openings, the exhaust pipes also connected to sides of a vehicle member constituting the front room to communicate between an inside space of the fuel cell stack and an outside of the fuel cell vehicle.

2. The fuel cell vehicle according to claim 1, wherein the end plates have projections projecting to a side at the upper parts thereof in the direction of gravity, the projections having the openings.

3. The fuel cell vehicle according to claim 1, wherein the side plates of the housing comprise two side plates connecting sides of the end plates.

4. The fuel cell vehicle according to claim 1, wherein the side plates of the housing comprise four side plates connecting sides of the end plates.

5. The fuel cell vehicle according to claim 1, wherein a side plate has a large-thickness portion at the top in the direction of gravity, the large-thickness portion extending in the stacking direction, the large-thickness portion comprising a recess extending in the stacking direction.

6. The fuel cell vehicle according to claim 5, wherein a length of the recess is greater than a thickness of the end plates.

7. The fuel cell vehicle according to claim 1, wherein the exhaust pipes comprise two exhaust pipes.

8. The fuel cell vehicle according to claim 7, wherein the two exhaust pipes extend away from the housing in opposite directions.

9. A fuel cell stack comprising:
a plurality of fuel cells that are stacked next to one another in a first direction, forming a laminate, and generate power by an electrochemical reaction between fuel gas and oxidant gas; and
a housing that includes rectangular end plates provided at ends, in a stacking direction, of the plurality of fuel cells and includes side plates connecting sides of the end plates,
wherein the end plates have openings at upper parts thereof in a direction of gravity, the openings communicating with a space formed between an inner wall of the housing and the laminate, and
wherein the end plates have projections at the upper parts thereof in the direction of gravity, the projections in a second direction orthogonal to the first direction, and the projections having the openings.

10. The fuel cell stack according to claim 9, wherein the side plates of the housing comprise two side plates connecting sides of the end plates.

11. The fuel cell stack according to claim 9, wherein the side plates of the housing comprise four side plates connecting sides of the end plates.

12. The fuel cell stack according to claim 9, wherein a side plate has a large-thickness portion at the top in the direction of gravity, the large-thickness portion extending in the stacking direction, the large-thickness portion comprising a recess extending in the stacking direction.

13. The fuel cell stack according to claim 12, wherein a length of the recess is greater than a thickness of the end plates.

* * * * *